United States Patent [19]

Kawaguchi et al.

[11] 4,000,362
[45] Dec. 28, 1976

[54] INSULATED WIRE WITH A SILICONE RELEASING LAYER

[75] Inventors: Munetaka Kawaguchi; Hirohiko Nakabayashi, both of Osaka, Japan

[73] Assignee: Sumitomo Electric Industries, Ltd., Osaka, Japan

[22] Filed: Mar. 6, 1973

[21] Appl. No.: 338,479

[30] Foreign Application Priority Data

| Mar. 6, 1972 | Japan | 47-22881 |
| Mar. 27, 1972 | Japan | 47-30516 |
| Apr. 19, 1972 | Japan | 47-39421 |
| Apr. 19, 1972 | Japan | 47-39422 |
| Apr. 19, 1972 | Japan | 47-39423 |
| May 15, 1972 | Japan | 47-47933 |
| May 15, 1972 | Japan | 47-47934 |

[52] U.S. Cl. .................. 174/120 SR; 174/110 S; 174/120 R; 338/214
[51] Int. Cl.² .................................. H01B 7/02
[58] Field of Search ...... 174/120 R, 120 SR, 110 S, 174/110 R; 117/6, 232; 338/214

[56] References Cited

UNITED STATES PATENTS

| 2,387,829 | 10/1945 | Burnham | 338/214 |
| 3,442,834 | 5/1969 | Flowers | 174/110 R |
| 3,484,540 | 12/1969 | Wilson | 174/120 R |
| 3,523,820 | 8/1970 | Sheffer | 174/120 SR X |

OTHER PUBLICATIONS

Currin "Selection Guide for Silicone Dielectrics" N Electronics 4-10-59 pp. 64 & 65.

*Primary Examiner*—E. A. Goldberg
*Attorney, Agent, or Firm*—Sughrue, Rothwell, Mion, Zinn and Macpeak

[57] ABSTRACT

An electrical insulation coated metallic wire consisting of a releasing layer coated on a metallic wire and an insulating layer superposed on the releasing layer. The insulating layer is formed by coating and baking an insulating varnish on the releasing layer. The electrical insulation coated metallic wire is used as an insulated conductive wire or an insulated resistance wire, the former using an electric conductor as the metallic wire and the latter using an electric-resistive substance as the metallic wire.

8 Claims, 1 Drawing Figure

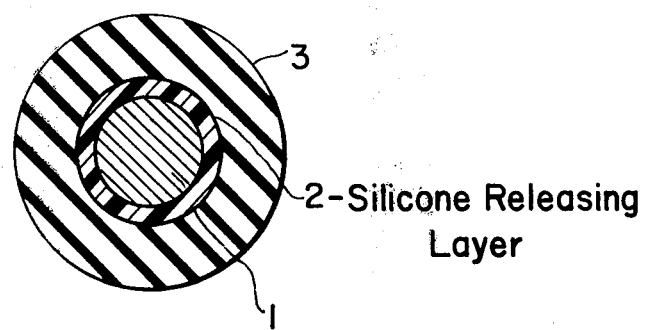

INSULATED WIRE WITH A SILICONE RELEASING LAYER

BACKGROUND OF THE INVENTION

1. Field of the Invention

The present invention relates to an electrical insulation coated metallic wire consisting of a releasing layer coated on a metallic wire with an insulating layer superposed on the releasing layer. The insulating layer formed on the releasing layer by coating and baking an insulating varnish on the releasing layer may easily be stripped from the metallic wire. The present electrical insulation coated metallic wire has excellent characteristics with respect to its thermal, mechanical, electrical and chemical properties, and can be used as an insulated conductive wire or an insulated resistance wire, the former using a conductor as the metallic wire and the latter using an electric-resistive substance as the metallic wire.

2. Description of the Prior Art

In conventional electrical insulation coated metallic wires which have hitherto been prepared, when the insulating layer is formed by coating and baking an insulating varnish on a metallic wire, the insulating layer can be stripped from the wire only with great difficulty. It has been considered that easy stripping as is achieved with the present invention would be impossible.

With respect to insulated conductive wires, particularly to those other than magnet wires, which are used for the wiring in electronic equipment or the like, it is an indispensable requirement that the insulating layer of the wire be easily stripped by means of simple tools to expose the conductor, for example, when the wires are to be connected together at their ends. For such use, insulation coated wires prepared by using an extrudable material such as polyethylene, polyvinyl chloride, polyamide, fluorinated ethylene-propylene copolymer, etc., have hitherto been utilized. In these coated wires prepared by the extrusion coating method, it has become necessary in recent years to reduce the thickness of the coating layer for the purpose of decreasing the space factor of the wire and to improve the thermal, electrical, mechanical and chemical characteristics thereof for the purpose of increasing the reliability.

More specifically, with respect to insulated wires for use in wiring the interior of electronic equipment (for example wires for use in wiring a computer, a communication control unit, etc.) among the various properties of such insulated wires, a reduction of the space factor thereof has become very important, especially when such electronic equipment include transistor systems, IC systems or LSI systems. Thus, a reduction in both the diameter of the conductor and the thickness of the insulating layer is required. Further, an appropriate impedance matching between the circuit and the insulated wire has also become important, and in particular, it has become necessary to reduce the impedance. In this case, in order to lower the characteristic impedance of insulated wires, it is important to thin the insulating layer of the wire. Moreover, together with the need to thin the insulating layer of insulated wires, another requirement has been to improve the thermal, mechanical and electrical characteristics of the insulated wires for the purpose of increasing further the reliability thereof.

In uses of insulated wires in electronic equipment such as computers, the cost proportion of the insulated wires for wiring the interior of the computer apparatus is about 0.7% of the total cost of the hardware of the computer, and it is believed that the cost proportion will be reduced to about 0.5–0.4%. Thus, the proportion is extremely small.

However, although computer manufactures attach the greatest significance to the reduction of the cost for wiring, the second-most important objective is the elimination of any miss-wiring, and an improvement in the reliability of the insulated wires and the like. Recently, automatic wiring systems have widely been adopted for the purpose of reducing the cost of wiring and for eliminating any miss-wiring, and at present about 80% of wiring operations have been accomplished by means of wiring apparatus. However, the mechanical damage imparted to insulated wires is great. As a result, not only is improvement with respect to the initial reliability of the wired insulated wires difficult to attain, but also it is difficult to maintain the reliability over a period of time (due to the poor mechanical strength of the insulating layer of the insulated wires). Further with respect to the use of such automatic wiring machines, the same drawbacks as noted above apply to other eqiupment which require wiring of the interior thereof in addition to the above mentioned computers.

Another wiring problem occurs, for example, with respect to insulated wires used for wire harnesses, e.g., wire harnesses used in automobiles. In making automobiles, it has hitherto been stressed to make as small as possible the devices which are used therein, for the purpose of reducing the weight thereof and for enlarging the area in the automobile which may efficiently be utilized by the passengers. Moreover, the necessary purification of the exhaust gases is generally done by adding additional devices to the conventional automobile. In the wiring used in an air purification device, heat resistance occassionally is required, for example, due to temperatures therein of higher than 200° C. Under such circumstances, it has become necessary to not only reduce the space factor, but also to improve the thermal resistance of on the insulated wires used in the wiring of such devices for automobiles. In order to satisfy such needs, it becomes necessary by all means to make as small as possible the diameter of the core wire of the insulated wires for wire harnesses which have been used up to the present, and also to thin the insulating layer.

With respect to heat resistance, difficult problems exist in conventional insulated wires having a conventional wire diameter and a conventional insulating film thickness since even such conventional insulated wires have poor resistance to heat at high temperatures, for example, temperatures higher than 200° C.

Under such circumstances, it is a very difficult problem to improve the heat resistance of insulated wires with the simultaneous reduction of the thickness of the insulating layer. Moreover, a high safety is required in automobiles, and so it is inevitable that a high reliability is being required more and more. Accordingly, in order to fully satisfy such needs, it is necessary to improve the thermal, electrical, mechanical and chemical characteristics of the insulated wires. These problems are related more or less to other insulated wires for wire harness other than those used for automobiles.

Apart from the above, in the communication cables of appliances for prevention of fire disasters and the like, an improvement of in heat resistance of these cables has also become absolutely indispensable.

Prior to the present invention, the insulated wires which have been used for the wiring of apparatus and the like have been produced by extrusion. In the insulation coating method by means of extrusion, however, reduction of the thickness of the insulating layer is limited. Various methods have been investigated for the purpose of reducing the thickness of insulating layer in the extrusion coating. However, when the thickness of the insulating layer become less than 100 $\mu$, it becomes very difficult with present technology to continuously and economically manufacture such insulated wires by means of the extrusion coating method.

In addition, when the core wire has been made very slender, various problems occur in the extrusion coating method such as wire-snapping, etc. The insulating layer provided by extrusion coating by using conventional materials have functions of not only electrically insulating the conductor but also of augmenting the thermal and mechanical characteristics of the insulated wire owing to the thickness of the insulating layer. Therefore, even if thinning of the insulating layer is desired in the extrusion coating method, or even if the thinning of the layer is actually performed in the extrusion coating method to the extent as industrially possible at present, the maintenance of the thermal and mechanical characteristics of the obtained insulated wires becomes very difficult. Furthermore, if the necessary maintenance of the thermal and mechanical characteristics is contemplated by using any materials other than the conventional ones, the scope of the materials which may be selected for utilization in the extrusion coating method is very limited, i.e., since the materials to be coated must necessarily have theremo-plasticity, be molten and further the molten materials must be stable for a long period of time at the melting temperature thereof. Accordingly, numerous factors with respect to the selection of the materials to be used exist, factors which depend upon the selectivity of the materials, the thermal characteristics (for example heat resistance, heat softening resistance, etc.), the mechanical characteristics (for example, abrasion resistance, etc.), the electrical characteristics (for example, characteristic impedance, etc.), the chemical characteristics, and so on. In addition, if such materials as having the highest thermal and mechanical characteristics of those which can satisfy the various conditions as mentioned above are used, the extruding conditions on the extrusion of the selected materials will naturally have to be more severe than in the case of the extrusion of conventional materials, and thus, it become still more difficult to contemplate a reduction in thickness of the insulating layer coated on the wires. For these reasons, it is impossible to actually manufacture insulated wires which satisfy the above-mentioned severe requirements by the extrusion coating method practised in this field, i.e., in view of the manufacture itself of the insulated wires and of the various characteristics themselves of the resulting insulated wires.

A second method for the manufacture of insulated wires is known. This method involved coating and baking an insulation varnish on a conductor. The insulated wires which are prepared by coating and baking the insulating varnish on the wire are used only in the field of so-called magnet wires. In this field, it is necessary to reduce the thickness of the insulating layer as much as possible, and further, extremely high characteristics are at the same time required concerning on the thermal, mechanical, electrical and chemical properties of the insulated wires. In addition, uniformity of the characteristics of the insulating layer is essential. Moreover, unlike insulated wires for use in wiring of electronic apparatus, in the field of magnet wires a close adhesion and a high coherence between the insulating layer and the conductor are absolutely necessary because of the natural characteristics of the magnet wires, and thus any easy stripping of the insulating layer from the conductor is detrimental and must be eliminated. Therefore, in testing of magnet wires, adhesion of the insulating layer determined by twisting of the wires and the coherence of the insulating layer to the conductor after sudden snapping of the wires are important factors.

With magnet wires, even in those which are said to be poor in coherence between the insulating layer and the conductor, the insulating layer will slightly rise up (or peel off) from the conductor only after severe testing as mentioned above, or in other words, only after such severe mechanical stresses have been imparted to the wires to be tested that the wires after being subjected to the testing can no longer be used as insulated wires, and of course the insulating layer of these magnet wires is never stripped easily from the conductor by means of simple tools even after the importing of mechanical stresses.

As will be apparent from the above explanation, the insulated wires for use in wiring of electronic equipment which are manufactured by the conventional extrusion coating method and the wires used in magnets, are quite different from each other with respect to (1) the thickness of the insulating layer, (2) the materials to be used, (3) the strippability and (4) the manufacturing methods themselves. Moreover, these two kinds of wires are also different from each other with respect to the costs, characteristics and fields of use. Under these circumstances, previous investigation has not hitherto taken into consideration concerning the use of magnet wires in the wiring of electronic equipment or even the possibility thereof. Accordingly, for the purpose of increasing, for example, the heat resistance of the insulated wires for the use in wiring of electronic equipment, a method for imparting a crosslinking to the polyethylene or polyvinyl chloride layer coated on the wire by means of a peroxide or of an electron-beam radiation has mainly been investigated.

However, the heat resistance of the thus treated wires still is not comparable to that of the insulating layer of magnet wires, and moreover, these wires are manufactured by the extrusion coating method as mentioned above and so the difficult problems on the thinning of the insulating layer are still not solved.

Being well familiar with the problems which must be solved in the field of the insulated wires, for example, those used in wiring of electronic equipment, manufactured by the conventional extrusion coating method and with various elements required of conventional insulated wires, the inventors have unexpectedly found that the difficult problems that have hitherto been involved in the field of insulated wires, particularly for use in wiring of electronic equipment can successfully be solved and the various requirements in this technical field can be achieved by utilizing the insulating materials of magnet wires and by adopting the manufacturing methods for these magnet wires in the field of insulated wires. Such utilization and adoption have not been taught by anyone up to the present.

Another filed in which the present invention deals is wires, which are termed insulated resistance wires. These wires have as the metallic wire an electric-resistive substance, and thus are different in function from the insulated conductive wires as explained hereinbefore.

The uses of such resistance wires widely vary, for example, they can be used in resistors, heat generators, thermo-coupler, etc., and according to the uses thereof, the structure, shape, wire diameter and characteristics of the wires also widely vary.

With respect to the structure of resistance wires, some naked resistance wires may be used as such, and on the other hand the wires may be coated for insulation.

With respect to the insulation of the resistance wires, various kinds of insulating materials and various insulation coating methods may be utilized. With respct to the shapes of the resistance wires, the wires may be used in the form of a rolled coil, or of a twisted wire or the like. Regarding the wire diameter, the diameter may be large such as several milli-meters or more, or may be small such as several ten milli-microns or less. With respect to the characteristics, various electrical, thermal, mechanical and chemical characteristics and so on are required, depending upon the uses of the resistance wires.

As mentioned above, the resistance wires have various uses, and among them, insulated resistance wires which are manufactured by coating and baking an insulating varnish on a resistance wire are utilized in applications wherein reduction of the space factor and electrical, thermal, mechanical and chemical characteristics are specifically required.

However, the insulated resistance wires which are prepared by coating and baking the insulating varnish have some difficulties such that when the insulating layer of the end of the said wire is to be stripped, the layer can be stripped only with difficulty by means of simple tools and the like. In view of such problems it has become important to manufacture insulated resistance wires in which the stripping of the insulating layer in their end parts is easy and which have a small space factor and excellent electrical, thermal, mechanical and chemical characteristics.

One example of such insulated resistance wires is in a thermocouple which is used for the measurement of temperature. In this case, as the insulating layer, in general, knitted glass yarns, extruded coating layer made of polyvinyl chloride are used. In some particular cases, insulated resistance wires which are prepared by coating and baking insulating varnish are used.

The thermo-couple is one which indicates a temperature by means of the thermo-electromotive force thereof, and so when it is connected to any other metal, an erroneous result will occur in the measurement. The deterisiation of the thermo-couple due to air or a gas under a high temperature results in variation of the electromotive force thereof or wire-snapping, etc. Accordingly, it is necessary that the thermo-couple is completely insulated, and it also is an indispensable matter that the insulating materials for the insulation must be thermally and chemically stable. In addition, severe mechanical stresses are imparted to the thermo-couple in some applications wherein the thermo-couple is used, and in such cases it cannot be permitted that the insulation of the thermo-couple be damaged due to the mechanical stresses. Thus, it is necessary that the insulating layer have a sufficient mechanical strength. In the conventional technical arts, the thermo-couple has hitherto been used for the measurement of temperature of various kinds of substances. In recent years, close temperature control has become required with the development of different industries, and it has become necessary to determine the temperature of very small substances which cannot be measured by means of conventional thermo-couples. For this reason, a reduction in the wire diameter of the thermo-couple and a reduction in the thickness of the insulating layer coated on the wire of the thermo-couple have become required so that the termo-couple may easily be inserted in such small substances to be measured. In conjunction with the need to reduce the thickness of the insulating layer, however, any decrease in the thermal, electrical, chemical and mechanical characteristics of the thermo-couple is not permissible in view of the above mentioned circumstances.

In cases where the thermo-couple is used for the measurement of the temperature of an atomic pile or of apparatus near an atomic pile, it is an indispensable condition that the thermo-couple to be used therefore have a resistance against radiant rays.

Anyhow, it is required to manufacture insulated thermo-couples in which the space factor is reduced and which have excellent thermal, electrical, chemical and mechanical characteristics. If these conditions are fully satisfied, the thermo-couples are complete. However, it is further required for the thermo-couples that the insulating layer of the insulated resistance wires can easily be stripped by means of simple tools so that the end part stripping can be easy.

As another example is a resistance wire which is used in the resistor of an electronic apparatus circuit.

In recent years, the sizes of electronic apparatus have noticeably been made smaller and smaller, and it has become desired to decrease the sizes of the resistors too with the increased use of a transistor system, an IC system or a LSI system in the circuit of the apparatus. Accordingly, a reduction of the diameter of the wire and the thinning of the insulating layer are required in the resistance used wires. Almost all of the resistors are ones which are prepared by closely rolling an insulated resistance wire in the form of a coil. In case an accurate resistance value is required, it is necessary to impart a heat treatment to the resulting resistor for the purpose of eliminating any strain which may occur during the rolling of the resistance wire in the coil form. For this purpose, it is necessary that the insulating layer be thermally stable.

In addition, it also is important that the strippability of the insulating layer from the core resistance wire is good whereby the insulating layer may easily be stripped at the end part of the wire when the wire is worked further.

As mentioned above, the matters which are required in the insulated resistance wires are as follows: The thinning of the thickness of the insulating layer is attained for the purpose of reducing the space factor, and at the same time the thin insulating layer has at least one or more excellent thermal, mechanical, electrical and chemical characteristics, and further the insulating layer may easily be stripped by means of simple tools.

Now, under such circumstances, insulated resistance wires which have been manufactured by coating and baking an insulating varnish on a resistance wire have been utilized at present. As the other insulation coating methods other than coating and baking method, there may be mentioned, for example, a knitted glass yarn coating method, a vinyl resin extrusion coating method and the like. In the former glass yarn method, however, reduction of the space factor cannot be expected, and in the latter resin extrusion method, the insulating layer cannot be used at a higher temperature of about 200° C, and at about 150° C or so, the resin is softened. Thus, these two methods do not comply with the above-mentioned requirements.

The insulating method for coating and baking an insulating varnish has been widely utilized in the field of insulated wires which are called as magnet wires. In the magnet wires, it is necessary to thin the thickness of the insulating layer as thin as possible, and further extremely high characteristics are required with respect to all of the thermal, mechanical, electrical and chemical properties thereof. These characteristics are the same as those which are required at present with insulated resistance wires, and it is not too much to say that in the present situation, only the insulated resistance wires which are manufactured by the coating and baking method of the insulating varnish have thin insulating layer which show excellent thermal, mechanical, electrical and chemical characteristics, or, in other words, any other wires which may have such thin insulating layers cannot be manufactured by means of any other conventional methods other than the above-mentioned coating and baking method. Because of this fact, the insulated resistance wires which are manufactured by coating and baking the insulating varnish on the core resistance wire are utilized in the field that the reduced space factor and the excellent thermal, mechanical, electrical and chemical characteristics are required.

However, in the insulated resistance wires which are manufactured by the coating and baking method of the insulating varnish, the insulating layer cannot easily be stripped. Accordingly, when the end parts of the wires are treated for stripping the coated layer, the insulating layer is removed by shaving or firing the same, or by decomposing the same, with chemical agents. Although such troublesome treatments are required for the removing of the insulating layers, the insulated resistance wires which are prepared by coating and baking the insulating varnish have been utilized at present. This is because, as mentioned above, any other wires which are prepared by other insulation coating methods do not satisfy the necessary factors which are required for the insulated resistance wires.

Under such circumstances, the insulated resistance wires which are prepared by coating and baking the insulating varnish have been utilized up to the present, but any improvement has not as yet been attained on the strippability of the insulating layer when the layer on the resistance wire is to be removed at its end part. Any investigation on the strippability of the insulating layer from the resistance wire by means of simple tools has not been performed or has not even been taken into consideration.

Having been well familiar with the matters which have been required up to the present on the insulated resistance wires, the inventors have found that manufacture of improved insulating resistance wires can be achieved by coating with an insulating varnish by means of a coating and baking method. In the insulated resistance wires according to the present invention, the insulating layer, may easily be stripped by means of simple tools. Such good strippability of the insulating layer has hitherto been considered impossible in the conventional technical arts, and has not even been taken into consideration.

SUMMARY OF THE INVENTION

The objects of the present invention are to eliminate the various defects in the conventional insulated metallic wires as mentioned above.

It is a primary object of the present invention to provide insulated wires having excellent electrical, thermal, mechanical and chemical characteristics, the insulating layer which has been coated on the conductor by means of a coating and baking method being able to easily be stripped from the conductor.

Another object of the present invention is to provide insulated resistance wires also having excellent electrical, thermal, mechanical and chemical characteristics, the insulating layer which has been coated on the resistance wire by means of a coating and baking method also being able to easily be stripped from the resistance wire.

The insulated conductive wires and the insulated resistance wires of the present invention are manufactured by coating and baking an insulating varnish on the conductor or on the resistance wire on which a releasing layer has previously been provided. The insulting layer thus formed on the conductor or the resistance wire according to the present invention can easily be stripped with simple tools. Moreover, the insulating layer having such good strippability possesses excellent electrical, thermal, mechanical and chemical characteristics which are equal to those of the conventional insulating layer which is formed by coating and baking an insulating varnish not having such good strippability.

Accordingly, the present invention provides electrical insulation coated metallic wires consisting of a releasing layer provided on a metallic wire and of one or more insulating layers which are superposed on the releasing layer by coating and baking an insulating varnish.

BRIEF EXPLANATION OF THE DRAWING

The FIGURE attached herewith shows a cross sectional view of the electrical insulation coated metallic wires of the present invention.

In this FIG. 1 is a metallic wire, 2 is a releasing layer, and 3 is an insulating layer.

DETAILED DESCRIPTION OF THE INVENTION

The present invention discloses two types of insulated metallic wires: one being an insulated conductive wire which has a conductor as the metallic wire; and the other being an insulated resistance wire which has a resistance wire as the metallic wire.

To begin with, the former type of insulated conductive wires will be explained hereunder.

The insulated conductive wires according to the present invention are coated with a thin insulating layer which has excellent electrical, thermal, mechanical and chemical characteristics. The provision of such a thin insulating film on the conductor has been impossible in the conventional extrusion coating method. In the insulated wires of the present invention, the insulating layer is provided on the conductor by means of a coating and baking method, and the thus provided insulating layer has a good strippability. In the conventional coating and baking methods which have hitherto been practised and which are explained in detail in the above explanation, such strippability cannot be imparted to the resulting insulated wires, or rather the possibility of the impartation of the strippability to the insulating layer has not be taught. Accordingly, the present invention has discovered and developed some novel uses of the insulated wires which are obtained by the coating and baking method. For example, the insulated wires of the present invention may advantageously be utilized for the wiring of electronic equipment, etc.

The characteristic features of the insulated wires according to the present invention will be explained hereunder more in detail. The thickness of the insulating layer which is to be provided on the conductor by means of the coating and baking method according to the present invention is about several microns or so per one coating and baking performance, and the characteristics of the insulating layer are extremely uniform. In the present invention, very severe control is possible with respect to the thickness of the insulating layer by virtue of repeated coating and baking steps to be performed several times to several ten times. Thus, it is possible in the present invention not only to thin the thickness of the layer to a degress which cannot be obtained in the conventional extrusion coating method, but also to obtain a thin and sufficiently accurate layer which may fully comply with any severe requirements relating to the electrical characteristics such as characteristic impedance and the like. With respect to the selection of the materials to be used which affect the thermal, mechanical and electrical characteristics and the like, any and every insulating material which is soluble in a solvent or may uniformly be dispersed therein can be used, for example thermo-plastic resins, thermosetting resins, infusible materials which are decomposed before melting, and the like, since in the present invention the coating and baking method of the insulating varnish is employed. Thus, there are no limited conditions for the selection of the materials, as in the the extrusion coating method wherein the coating materials must be thermo-plastic and can be molten, and further the molten materials must be stable for a long period of time at the melting temperature thereof. Accordingly, in the insulating wires according to the present invention the scope for the selection of the materials to be used as the insulation layer is far wider than that in the extrusion coating method, and thus various kinds of materials may widely be selected depending upon the uses of the resulting insulated wires. For example, when the excellent mechanical properties are especially required, the use of polyvinyl-formal series or polyamide-imide series materials is advantageous, and when the excellent thermal properties are required, the use of polymers which contain imide groups is desirable. When both the thermal and the mechanical characteristics are required, the use of the polyamide-imide series materials is advantageous. These embodiments are ones which are merely exemplified as some preferred ones, and when the other characteristics are required, it of course is possible to select some pertinent materials corresponding to the desired characteristics. In addition, the selection of the materials may be freely chosen considering the balance between the required characteristics and the costs of the materials.

With respect to the strippability of the insulating layer, the conventional insulated wires prepared by means of mere conventional coating and baking method do not have the such an ability. Therefore, in the conventional insulated wires, various troublesome treatments are required for the removal of the insulating layer such that the insulating layer is to be shaved off by means of a mechanical treatment or decomposed by means of chemical agents or otherwise removed off by combustion. In any case, the stripping treatment of the layer is very troublesome. Anyway, in conventional coating and baking methods, it cannot be expected to manufacture insulated wires whose insulating layer may easily be stripped by means of simple tools such as wire stripper, as in the insulated wires manufactured by the extrusion coating method. In the insulated wires of the present invention, a releasing layer is provided between the insulating layer and the conductor, the releasing layer wrapping the conductor. Thus, the insulated wires of the present invention, although being manufactured by coating and baking method, have a strippable insulating layer, analogously to the insulated wires obtained by extrusion coating method. That is, according to the present invention, the insulating layer stripping by means of simple tools is possible, which, however, has hitherto been quite impossible in the conventional insulated wires obtained by a conventional coating and baking methods.

Now, the other type of electrical insulation coated metallic wires according to the present invention, or insulated resistance wires will be explained hereunder.

In the first place, the characteristic features of the insulated resistance wires according to the present invention will be explained in detail.

The thickness of the insulating layer which is to be provided on the resistance wire by means of the coating and baking method according to the present invention is about several microns or so per one coating and baking performance, and the chracteristics of the insulating layer are extremely uniform. In the present invention, very severe control is possible on the thickness of the layer by virtues of repeated coating and baking to be performed several times to several ten times. Thus, insulated resistance wires having sufficiently small space factor can be obtained according to the present invention.

With respect to the selection of the materials to be used which severely affect the thermal, electrical, mechanical and chemical characteristics, any and every insulating material which is soluble in a solvent or may uniformly dispersed therein can be used, since in the present invention the coating and baking method of the insulating varnish is employed. For example, the materials which are durable in the use at a high temperature, for example of 200° C may be selected as the materials of the present invention. With respect to the strippability of the insulating layer, any conventional insulated resistance wires prepared by means of mere conventional coating and baking method do not have the said ability. Therefore, in the conventional insulated resistance wires, various troublesome treatments are required for the removal of the insulating layer such that the insulating layer is to be shaved off by means of a mechanical treatment or decomposed by means of chemical agents or otherwise removed off by combustion. In any case, the stripping treatment of the layer is very troublesome. Anyway, in the said conventional coating and baking method, it cannot be expected to manufacture insulated resistance wires whose insulating layer may easily be stripped by means of simple tools such as wire stripper. In the insulated resistance wires of the present invention, a releasing layer is provided between the insulating layer and the resistance wire element. Thus, the insulated resistance wires of the present invention, although being manufactured by coating and baking methods, have an insulating layer strippability which is for example analogous to that in the insulated resistance wires obtained by extrusion coating method. That is, according to the present invention, the insulating layer stripping by means of simple tools is possible, which, however, has hitherto been impossible in the conventional insulated resistance wires obtained by a conventional coating and baking method.

In the present invention the insulating layer is formed by coating and baking the insulating varnish on the resistance wire, and the thickness of the said layer may freely be controlled varing from several microns to ten and several microns or more. Thus, the reduction of the space factor can easily be attained. Although the insulating layer of the present insulated resistance wire is extremely thin as mentioned above, it will be well understood that the said layer shows excellent thermal, electrical, chemical and mechanical characteristics which are far superior to those of the insulating layer formed by means of extrusion coating. In the present invention, moreover, the releasing layer is provided between the insulating layer and the resistance wire, and so when the end parts of the insulated resistance wires obtained by the present invention are treated, the strippability of the insulating layer thereof is good and it is possible to strip the said insulating layer by means of simple tools such as wire stripper.

The insulated resistance wire according to the present invention can be utilized in various uses, for example, in a thermo-couple to be used for the measurement of temperature and in a resistor to be used in an electronic apparatus circuit. The insulated resistance wire of the present invention can satisfy the severe requests required for these insulated resistance wires as mentioned above. In addition, the end part stripping of the insulating layer is easy, and so by the use of the insulated resistance wire of the present invention, it became possible to greatly reduce the operation period on the incorporation of circuit and the combination of wires.

The insulated resistance wire according to the present invention is characterized by the reduction of the space factor thereof, the easy stripping of the insulating layer thereof, as well as the excellent electrical, thermal, mechanical and chemical characteristics thereof. Thus, the present insulated resistance wires may be widely and efficiently be utilized in various kinds of uses wherein the above mentioned characteristics are required.

In the above explanation, the two types of the embodiments of the present invention, one being insulated wire and the other insulated resistance wire, are explained in detail. After all, the present invention provides electrical insulation coated metallic wires, whose insulating layer formed by coating and baking can easily be stripped and has excellent electrical, thermal, mechanical and chemical characteristics.

In the present invention, a conductor or a resistance wire is used as the metallic wire, as mentioned above. The conductor to be used in the present invention is a so-called metallic wire to be used in a general electric wire. As the examples of the conductor are mentioned copper wire, aluminum wire, silver plated copper wire, copper clad aluminum wire, oxygen free copper wire, silver plated oxygen-free copper wire, copper alloy wire, silver plated copper wire, etc.

In the present invention, the resistance wire is an electro-resistive substance which may be used as a metallic wire.

The resistance wire in the present invention differs from a conductor used as an electro-conductive wire with respect to the uses thereof, and means a general term wherein the resistance of metal, alloy, etc., which are the materials of the resistance wire and the relation between the resistance and the temperature of the materials, and the like are utilized. The articles wherein the resistance wires of the present invention are used are, for example, thermocouples, resistor heat generators, etc. The representatives of the resistance wires are, for example, nichrome wire, manganese wire, chromel wire, alumel wire, constantan wire, etc.

In the present invention the releasing layer is one which is formed from the materials to be used as a releasing agent.

The representatives of the releasing layer are, for example, silicone, paraffin, fluoro-carbon, etc. The preferred releasing layer is one which mainly consists of a silicone having a releasing ability. The representatives of the releasing silicones are, for example, KF96, KF965, KS700, KS701, KP301, KP321, KP330, KP340, KP354, KR282, KC88, KS705F, KS706, KS709, KS709S, KS711 (these are trade names by a Japanese company, Shinetsu Chemical Industries Co.), and the like.

In particular, it is more preferable to use a silicone solution or a silicone dispersion, which may form a layer when the solvent is dried, rather than to use the oil such as KF96 and KF965. In the drying step of the solvent, when the silicone is reacted to form a layer, it is preferable to add a slight amount of a hardener. The representatives of the hardeners are, for example, Catalyst PS and Catalyst PD (by Shinetsu Chemical Industries Co.) and the like.

The most preferred releasing layer is one formed by coating and baking a composition consisting of as the main ingredient a silicone having a releasing ability.

In the formation of the releasing layer, it is preferable to form the layer by coating and baking a silicone rather than by merely coating the same. In the former coating and baking method, the releasing ability of the releasing layer is more excellent than the latter mere coating method. In addition, after an insulating varnish has been coated and baked on the releasing layer which was formed by the coating and baking method, and electric insulation coated metallic wire having a good appearance is obtained.

As the insulating layer of the present invention, a layer such as has been formed by coating and baking an insulating varnish to be used in the formation of conventional magnet wire is preferred.

Representatives of the insulating varnishes include resins such as polyvinyl formal, polyvinyl butyral, polysulfone, phenoxy, polyurethane, acrylic, epoxy, thermo-plastic polyester, B-class thermo-setting polyester, H-class thermo-setting polyester, F-class polyester-imide, H-class polyester-imide, polyester-amide-imide, silicone, polyhydantoin, poly-paravanic acid, polyamide (for example 6-nylon, 6,6-nylon, 6,10-nylon, 11- nylon, 12-nylon, copolymerized nylon), polyamide-imide, polyimide (including polyimidazopyrrolone). Apart from these, insulating varnishes consisting of a solution or a dispersion wherein a monomer, a prepolymer, a copolymer or a mixture thereof which has an insulating ability and may form a film after being coated and baked is dissolved or dispersed in a solvent may also be used. Representatives of those insulating varnishes include resins such as polyvinyl chloride, poly-tetrafluoro-ethylene, etc., as the main ingredient.

The polyamide-imide insulating varnishes to be used in the present invention are ones consisting of a polyamide-imide resin or a polyamide-imide precursor resin as the main ingredients, and include those to which a resin or a mixture thereof which is generally used as an additive resin for insulating varnishes, such as an epoxy resin, a phenol resin, a polyisocyanate, a stabilized polyisocyanate, etc., is partly added. These additive resins may be added to the insulating varnishes singly or in the form of a combination thereof.

The manufactures of the polyamide-imide resins, the solutions of the resins, the polyamide-imide precursor resins or the solutions of the precursor resins, which resins are the main ingredients of the polyamide-imide insulating varnishes of the present invention, are described, for example, U.S. Pat. Nos. 3,355,427, 3,448,068, 3,562,217 and 3,518,230.

One of the ways of manufacture is to react at least one tri-carboxylic acid anhydride chloride and at least one diamine. A part of the tri-carboxylic acid anhydride chloride may be substituted by at least one di-carboxylic acid di-chloride, or by at least one tetra-carboxylic acid di-anhydride, or by at least one di-carboxylic acid di-chloride and at least one tetra-carboxylic acid di-anhydride. In addition, a part of the diamine may also be substituted by at least one triamine, or by at least one tetramine, or by at least one triamine and at least one tetramine. Representatives of the tricarboxylic acid anhydride chlorides are, for example, trimellitic-anhydride-4-chloride, etc. Representatives of the dicarboxylic acid di-chlorides are, for example, terephthalic acid di-chloride, isophthalic acid di-chloride, adipic acid di-chloride, etc. Representatives of the diamines are, for example, 4,4'-diaminodiphenylmethane, 4,4'-diaminodiphenylether, m-phenylene-diamine, etc. Representatives of the triamines are, for example, 3,4,4'-triamino-diphenylether, etc. Representatives of the tetramines are, for example, 3,3',4,4'-tetramino-diphenylether, etc.

Another typical way of manufacture is to react at least one tricarboxylic acid anhydride and at least one diisocyanate. A part of the tricarboxylic acid anhydride may be substituted by at least one dicarboxylic acid, or by at least one tetracarboxylic acid di-anhydride, or by at least one dicarboxylic acid and at least one tetracarboxylic acid di-anhydride. In addition, a part of the diisocyanate may also be substituted by at least one tri-valent or more polyisocyanate. Representatives of the tricarboxylic acid anhydrides are, for example, trimellitic anhydride, etc. Representatives of the dicarboxylic acids are, for example, isophthalic acid, terephthalic acid, adipic acid, etc., Representatives of the tetracarboxylic acid di-anhydrides are, for example, pyromellitic dianhydride, benzophenone-tetracarboxylic acid di-anhydride, etc. Representatives of the diisocyanates are, for example, diphenylmethane-4,4'-diisocyanate, diphenylether-4,4'-diisocyanate, tolylene-di-isocyanate, xylylene-diisocyanate, hexamethylene-diisocyanate, etc. Representatives of the polyisocyanates are, for example, polymethylene-polyphenylene-polyisocyanate, etc. In the present invention, the manufacture using the isocyanate is preferable. This is because the insulating varnishes prepared by the isocyanate method may form wires having a good appearance. The most preferred resin in the present invention is one which was manufactured by reacting trimellitic anhydride and diphenylmethane-4,4'-diisocyanate in an organic solvent.

The polyimide (including poly-imidiazopyrrolone) insulating varnishes of the present invention are ones which consist of, as the main ingredient thereof, a polyimide (including polyimidazopyrrolone) resin or a polyimide (including poly-imidazopyrrolone) precursor resin, and include those a part of which has been modified with a resin or a mixture thereof which is generally used as an additive resin for insulating varnishes, such as an epoxy resin, a phenyl resin, a phenol resin, a polyisocyanate, a stabilized polyisocyanate, etc. These additive resins may be added to the insulating varnishes singly or in the form of a combination thereof. The manufactures of the polyimide (including poly-imidazopyrrolone) resins or the solutions of the resins or the poly-imide (including polyimidazopyrrolone) precursor resins or the solutions of the precursor resins, which resins are the main ingredient of the polyimide (including poly-imidazopyrrolone) insulating varnishes of the present invention, are described, for example, U.S. Pat. Nos. 3,277,043 and 3,666,709.

One of the ways of manufacture is to react at least one tetracarboxylic acid di-anhydride and at least one polyamine. Representatives of the tetra-carboxylic acid di-anhydride used in the said manufacture are, for example, pyromellitic di-anhydride, benzophenone-tetracarboxylic acid di-anhydride, etc. As the polyamines, a diamine, a triamine, and a tetramine are mainly used. The preferred triamines are ones which have two ortho-positioned amino groups among the three amino groups. The preferred tetramines are ones which have a pair of two ortho-positioned amino groups. Representatives of the diamines are, for example, 4,4'-diaminodiphenylether, 4,4'-diamino-diphenylmethane, etc. Representatives of the triamines are for example, 3,4,4'-triamino-diphenylether, 3-aminobenzidine, etc. Representatives of the tetramines are, for example 3,3',4,4'-tetramino-diphenylether, 3,3'-diamino-benzidine, etc. The insulating layer may be changed, depending upon the required characteristics. If a thermal property is required, polyesterimides, polyester-amide-imides, poly-amide-imides, polyhydantoin and polyimides are desirable. For the insulating layer which has at the same time every one of thermal, mechanical, electrical and chemical properties, polyamide-imides are most desirable. In addition, a multi-structure comprising a combination of two or more insulating layers is of course preferable, and for example, it is preferable to position a polyamide-imide insulating varnish at the outermost layer in view of the relation of the cost and the characteristics thereof.

In order to lower the abrasion factor of the insulating layer, it is preferable to coat and bake at least one insulating varnish layer to which a silicone is added at the outermost layer of the insulating layer. In addition, it is also is preferable to optionally use a mixture of two or more kinds of insulating varnishes.

Even if the thickness of the insulating layer exceeds $100\mu$, the layer shows more excellent characteristics than the insulated wires obtained by any other methods. However, the insulated wires of the present invention display the most effective effect when the thickness of the insulating layer thereof is lower than 100μ. This is because it is actually impossible, as mentioned above, to practically manufacture any insulated wires as having an insulating layer of thinner than 100μ by means of any other method, and if being manufactured, the resulting wires do not fully satisfy the required characteristics.

If the releasing layer is one which consists of, as the main ingredient, a silicone having a releasing ability, it is preferable to provide an insulating layer directly on the releasing layer by coating and baking an insulating varnish to which a silicone is added.

The silicone and the insulating varnish are extremely incompatible, and so when the insulating varnish is directly coated and baked on the releasing layer which consists of, as the main ingredient, the releasable silicone, repelling or foaming sometimes occur. It is believed that the silicone and the insulating varnish are incompatible because the free energy of the surface of each substance extremely differs from each the other. When the silicone is added in the insulating varnish, the difference of each surface free energy becomes small whereby the repelling of the insulating varnish is reduced.

Accordingly, if the releasing layer is one which consists of, as the main ingredient, a silicone having a releasing ability, the insulating layer may well be provided directly on the releasing layer by coating and baking an insulating varnish to which a silicone is added, whereby an electric insulation coated metallic wire having a good appearance may be industrially, stably and continuously manufactured.

Representatives of the silicone to be added are, for example, KF96, KF965, KS700, KS701, KP301, KP321, KP330, KP340, KP354, KR282, KC88, KS705F, KS709, KR213 (by Shinetsu Chemical Industries Co.), etc.

By the provision of the insulating layer of coated and baked insulating varnish to which a filler is added, directly on the releasing layer, an electric insulation coated metallic wire having a good appearance may be obtained.

When the insulating layer is directly coated and baked on the releasing layer, repelling or foaming sometimes occurs. In nature, the releasing layer and the insulating varnish are incompatible with each other, and so repelling is apt to occur very often as mentioned above.

Referring back to the step to coating and baking the insulating varnish on the releasing layer, in the first coating step, the insulating varnish is forcedly and continuously coated, and the coating is performed, in general, at near at room temperature, and so the flowing of the insulating varnish is slow and any rapid repelling does not occur in this coating step. In the baking step, however, since the temperature is high, the viscosity of the solution of the coated insulating varnish becomes lower, and so the solution becomes to easily flows. Thus, the insulating varnish solution is repelled extremely. When the viscosity of the insulating varnish has once become lowered, an evaporation of the solvent occurs, and as the case may be, a curing reaction would also occur in some kinds of insulating varnish, and thereafter the viscosity finally becomes higher thereby forming an insulating layer whereupon the insulating varnish is no more repelled. Accordingly, it is considered that the repelling and the foamimg will occur when the viscosity of the insulating varnish has become lowered in the baking furnace. Therefore, it is considered necessary, in order to prevent the occurrence of such repelling or the like, to conduct the formation of the insulating layer immediately after the coating and before the lowering of the viscosity of the coated varnish.

However, for the provision of the insulating varnish, the baking step is inevitable.

More precisely, a high temperature atmosphere is kept in the furnace and so it is inevitable that the viscosity of the insulating varnish is once lowered whereby the occurrence of the repelling also is inevitable.

When a filler is added to the insulating varnish, if the viscosity of the insulating varnish is lowered and the varnish begins to flow, the flow around the filler is disturbed due to the existance of the filler whereby some superfluous work is required of the varnish and thus the flowing resistance thereof becomes large and the degree of lowering the viscosity.

During the baking step in the presence of the filler, the evaporation of the solvent proceeds and the formation of the insulating layer proceeds further.

By the addition of the filler, the viscosity of the insulating varnish does not lower to such degree that a rapid repelling occurs, and the viscosity of the varnish meanwhile increases before the occurrence of the repelling whereby the layer is formed and thus any repelling does not occur. Accordingly, it will be possible to form an insulating layer having a smooth and even surface without the occurrence of any repelling in the coating and baking step.

If the releasing layer is one which consists of, as the main ingredient, a silicone having a releasing ability, an electrical insulation coated metallic wire having better appearance may be manufactured by providing an insulating layer of coated and baked insulating varnish to which a filler and a silicone are added, directly on the releasing layer.

Representatives of the fillers to be added are, for example, aluminum oxide, silicon di-oxide, titanium oxide, magnesium oxide, zinc oxide, clacium carbonate, magnesium carbonate, etc.

By the provision of an insulating layer of a coated and baked insulating varnish containing an polyimide-series polymer directly on a releasing layer, an electrical insulation coated metallic wire having a good appearance may be obtained.

The releasing layer and the insulating varnish are incompatible with each other, and so repelling is apt to occur very often.

The insulating varnish containing the above mentioned polyimide-series polymer of the present invention is the preferred embodiment for satisfying the noted condition of reduced repelling. That is, the resin which is the main ingredient of the insulating varnish containing the polyimide-series polymer has a high molecular weight and so does not flow even under a high temperature. Although the viscosity is once lowered in a high temperature atmosphere, the viscosity gradually increases with the evaporation of the solvent, whereupon the resin itself does not flow so much, having a high molecular weight as mentioned above. Under the circumstances, it is considered that the viscosity of the said varnish may increase easily and speedily and thus the repelling of the varnish will not occur so much.

In the present invention, representatives of the polyimide series polymers which are the main ingredients of the said insulating varnishes are, for example, the above-mentioned polyimide (including polyimidazopyrrolone) resins, polyamide-imide resins, polyester-imide resins, polyester-amide-imide resins, etc.

Of course, it is preferable to add a filler to the insulating varnish containing the polyimide-series polymer. In addition, if the releasing layer is one which consists of, as the main ingredient, a silicone having a releasing ability, it is preferable to add a silicone or a silicone and a filler to the insulating varnish containing the polyimide-series polymer.

It is preferable to provide at least one self-bonding layer at the outermost layer of the insulating layer. When the electrical insulation coated metallic wires of the present invention are ones to be used as the wires for wiring the interior of electronic equipment, the said provision is particularly effective.

The wires for the use in wiring the interior of electronic equipment are used very often in the form of twisted wires. It is required that the characteristic impedance in the respective wires be constant, and in recent years to be small. Accordingly, if at least one self-bonding layer is provided at the outermost layer of the insulating layer, the distance in the resulting wires in kept constant after being twisted and bonded, and the wires do not loosen during the wiring thereof, and so it is possible to attain a determined and constant characteristic impedance. The self-bonding layer is formed by coating and baking an insulating varnish which is used in the manufacture of self-bonding magnet wire.

It is preferable to provide a colored layer at the outermost layer of the insulating layer.

When the electrical insulation coated metallic wires of the present invention are used in such form that several wires are bundled or twisted, it is preferable to differently color the respective wires. The bundled or twisted wires which are differently colored are very advantageous in the use thereof for wiring. In particular, these wires are especially effective in such field that twisted insulation wires are mostly used, which are, for example, insulated wires for wiring the interior of electronic apparatus. The colored layer is formed by coating and baking an insulating varnish to which a dye and/or a pigment is (are) added. In addition, it is possible to color the insulating layer by coating an ink on the said layer.

It is possible to coat an insulating composition by extrusion on the electrical insulation coated metallic wires of the present invention or on the twisted or bundled combination thereof.

The thus coated wires of the present invention are free from the defects of the conventional electrical insulation coated metallic wires which are prepared by the above-mentioned extrusion coating of the insulating composition. That is, the wires of the present invention have an insulating layer which has been formed by coating and baking an insulating varnish, and so the heat resistance and the mechanical properties of the wires are very much improved. In addition, by the provision of the above-mentioned releasing layer, the insulating layer of the wires of the present invention may easily be stripped. Accordingly, the wires of the present invention which are further coated with the insulating composition are effectively used as the heat resistance wires for use in wiring fire-fighting equipment or in thermo-couples and the like. As the insulating composition to be used for extrusion coating, any and every conventional composition which is used in the conventional extrusion coated wires may be utilized in the present invention. Representatives of such insulating compositions are those which include, as the main ingredient, for example, polyethylene and copolymer thereof, polypropylene and copolymer thereof, ethylene-propylene copolymer, ethylene-vinyl acetate copolymer, vinyl chloride, chlorinated polyethylene, fluorinated ethylene-propylene copolymer, polytetrafluoro ethylene, polyamide, polyester, polysulfone, polyphenylene oxide, butyl rubber, isoprene-butylene copolymer, chloro-sulfonated polyethylene, chloroprene, natural rubber, silicone rubber, etc. It is preferable to add a plasticizer, an anti-aging agent, etc., to the insulating composition. In addition, it also is preferable to convert the insulating compositions to cross-linked ones by the treatment with a peroxide or by means of electron-beam radiation. Further, it also is preferable to use the insulating compositions in the form of a blended mixture or to form a multi-structure layer after being extruded and coated, according to the uses and the purposes of the resulting wires. The insulating composition may be varied, depending upon the uses, the necessary characteristics, or the previously determined specifications of the resulting wires. If a flame resistance property is required, it is preferable to use vinyl chloride, chlorinated polyethylene, etc. The thermal decomposition of the vinyl chloride results in the generation of hydrogen chloride gas, which sometimes badly affects the insulated layer of the coated and baked insulating varnish. In order to prevent from such unfavorable phenomennon, it is advantageous to add calcium carbonate or magnesium carbonate or a mixture of the two to the vinyl chloride resin whereby the hydrogen chloride gas may be trapped.

Now, the present invention will be explained more in detail in the following Referential Examples, Comparative Examples and Working Examples, which, however, do not whatsoever limit the scope of the present invention.

In the following Examples, KS700, KS701, KR282, KP330, KC88, KS705F and KS709 are silicones commercially sold from Shinetsu Chemical Industries Co. In the use of KS705F and KS709, a slight amount of catalyst PS (by Shinetsu Chemical Industries Co.) was added thereto.

In the following Referential Examples, various types of insulating varnishes and insulating compositions which are used in the Comparative Examples and the Working Example to follow are illustrated.

REFERENTIAL EXAMPLE 1

192.1g (1.0 mol) of trimellitic anhydride and 250.3g (1.0 mol) of diphenylmethane-4,4'-diisocyanate were added to the mixture solvent consisting of 630g of N-methyl-2-pyrrolidone and 270g of solvent naphtha (Swasol No. 1000 by Maruzen Petroleum Chemical Co., Japan) and were reacted for 3 hours at 80° C. After the reaction, the whole was heated up to 165° C in the course of 6 hours and then the reactants were reacted further for 2 hours at this elevated temperature whereby polyamide-imide insulating varnish was obtained. The reduced specific viscosity of the resin was 0.54.

REFERENTIAL EXAMPLE 2

200.2g (1.0 mol) of 4,4'-diamino-diphenylether were dissolved in 1500g of N-methyl-2-pyrrolidone and cooled with ice. Next, 218.1g (1.0 mol) of pyromellitic di-anhydride were gradually added thereto while the ice-cooling of the reaction container was continued, at last to form a viscous polymer solution. 500g of N,N-dimethyl-acetamide were added further to the solution to dilute the same. The reduced specific viscosity of the resulting resin was 1.58.

REFERENTIAL EXAMPLE 3

A polyamide insulating varnish was obtained by the following method.

160.2g (0.8 mol) of 4,4'-diamino-diphenylether and 43.0g (0.2 mol) of 3,4,4'-triamino-diphenylether were dissolved in 1500g of N-methyl-2-pyrrolidone and cooled with ice. Next, 218.1g (1.0 mol) of pyromellitic anhydride were gradually added thereto, while the ice-cooling of the reaction container was continued, at last to form a viscous polymer solution. 500g of N,N-dimethyl-acetamide were added further to the solution to dilute the same. The reduced specific viscosity of the resulting resin was 1.47.

REFERENTIAL EXAMPLE 4

| (1) | Dimethyl terephthalate | 388 g |
| --- | --- | --- |
| (2) | Ethylene glycol | 81 g |
| (3) | Glycerin | 92 g |
| (4) | Tris-($\beta$-hydroxyethyl)-isocyanurate | 44 g |
| (5) | Litharge | 0.2 g |
| (6) | Xylene | 400 g |

These ingredients (1) through (6) were reacted under heat at 130°–140° C for 5 hours to distill off distillates of low boiling points. Next, the whole was gradually heated, while substances of low boiling points were distilled off, up to 240° C, and at the time when the reaction product became viscous, cresol was added to form a solution containing 40% of solid contents. To this solution was added solvent naphtha (Swasol No. 1000 by Maruzen Petroleum Chemical Co.) to make a solution containing 30% of solid contents. To the resulting solution were added 1.5%, on the basis of the whole weight of the solid resin content, of tetrabutyl-titanate and 4%, on the basis of the said weight, of Desmodur CT Stable (by Bayer A. G. of Germany), and these were mixed with stirring to form a uniform solution.

REFERENTIAL EXAMPLE 5

384.2g (2.0 mol) of trimellitic anhydride was added to 1500 g of cresol at 150° C and stirred. 198.2g (1.0 mol) of 4,4'-diamino-diphenylmethane dissolved in 750g of cresol were added thereto, and the whole was gradually heated up to 160° C and was stirred with heat for 4 hours at this temperature. After being cooled, pale yellow fine crystalline precipitates crystallized out. The precipitates were filtered out and washed with alcohol and acetone several times.

Next, 242.5g of dimethyl-terephthalate, 122.5g of ethylene-glycol, 92.1g of glycerin, 0.2g of cadmium acetate and 200g of xylene were mixed with stirring and heated up to 130°–140° C, and then reacted for 5 hours at this temperature. The reaction mixture was thereafter gradually heated up to 180° C while distillates of low boiling points were distilled out. To this were gradually added 410.0g of dimide dicarboxylic acid having five-membered cyclic imide ring in the molecule and prepared from the above-mentioned trimellitic anhydrode and 4,4'-diamino-diphenylmethane, and the temperature thereof was kept at 200° C whereby the diimide dicarboxylic acid was completely absorbed in the reaction system. Thereafter the whole was heated gradually up to 230° C, and at the time when the reaction mixture became fully viscous, cresol was added to form a solution containing 35% of solid contents. To the resulting solution were added 2%, on the basis of the whole weight of the solid resin content, of tetrabutyl-titanate and stirred to obtain a thermosetting polyester-imide insulating varnish.

REFERENTIAL EXAMPLE 6

To a mixture of 384.2g (2.0 mol) of trimellitic anhydride and 312.8g (1.25 mols) of diphenylmethane-4,4'-diisocyanate were added 150g of solvent naphtha (Swasol No. 1000 by Maruzene Petroleum Chemical Co.), and was reacted for 2 hours at 150° C and thereafter for 4 hours at 160° C. In this reaction, carbon dioxide was evolved with the proceeding of the reaction, and the trimellitic acid was dissolved to form a pale yellow and uniformly transparent solution, and with the further proceeding of the reaction, the reaction mixture foamed and solidified. According to the infrared absorption spectrum analysis of the resulting solid, it was confirmed that absorption of amide bond, five-membered imide bond and carboxylic group appeared and that absorption of isocyanate group disappeared. The preparatory condensation product thus obtained was pulverized.

Next, 242.5g of dimethyl terephthalate, 124g of ethylene glycol, 348g of tris-($\beta$-hydroxyethyl)isocyanurate and 0.2g of litharage were mixed and stirred, and then gradually heated with the removal of distillates of low boiling points, and at the time when the temperature of the mixture was elevated up to 200° C, the above-mentioned preparatory condensation product was gradually added to this mixture while keeping the temperature thereof at 200° C. After 5 hours, the temperature was elevated further up to 230° C, and at the time when the reaction mixture became uniform and transparent and fully viscous, cresol was added thereto to form a solution containing 30% of solid contents. To this solution were added 3.0% on the basis of the whole weight of the solid resin content of tetraoctyl titanate and 4%, on the basis of the said weight, of Desmodur CT Stable (by Bayer A. G.) and the whole was admixed and stirred to form a uniform solution, whereby a thermosetting polyester-imide insulating varnish (or polyester-amide-imide insulating varnish) was obtained.

REFERENTIAL EXAMPLE 7

Polyvinyl formal resin and phenol resin were dissolved in cresol, and Desmodur AP Stable (by Bayer A. G.) was added to the resulting solution whereby a formal insulating varnish was obtained.

REFERENTIAL EXAMPLE 8

To 100 parts by weight of the polyamide-imide insulating varnish obtained in the Referential Example 1 was added 1 part by weight of KS701 and fully admixed and stirred, whereby another type of insulating varnish was obtained.

REFERENTIAL EXAMPLE 9

To 100 parts by weight of the polyamide-imide insulating varnish obtained in the Referential Example 1 were added 2 parts by weight of KS700, and fully admixed and stirred, whereby another type of insulating varnish was obtained.

REFERENTIAL EXAMPLE 10

To 100 parts by weight of the polyamide-imide insulating varnish obtained in the Referential Example 1 was added 0.5 part by weight of KP321, and fully admixed and stirred, whereby another type of insulating varnish was obtained.

REFERENTIAL EXAMPLE 11

To 100 parts by weight of the insulating varnish obtained in the Referential Example 2 were added 1.5 parts by weight of KP330, and fully admixed and stirred whereby another type of insulating varnish was obtained.

REFERENTIAL EXAMPLE 12

To the polyamide-imide insulating varnish obtained in the Referential Example 1 was added $SiO_2$ (Aerosil 200 by Nippon Aerosil Co.) in an amount of 5% by weight thereof on the basis of the resin solid content of the said polyamide-imide insulating varnish, and fully stirred and dispersed whereby another type of insulating varnish was obtained.

REFERENTIAL EXAMPLE 13

To the polyamide-imide insulating varnish obtained in the Referential Example 1 was added $Al_2O_3$ (by Degussa A. G. of Germany) in an amount of 6% by weight thereof on the basis of the resin solid content of the said polyamide-imide insulating varnish, and fully stirred and dispersed, whereby another type of insulating varnish was obtained.

REFERENTIAL EXAMPLE 14

To the polyamide-imide insulating varnish obtained in the Referential Example 1 was added $TiO_2$ (by a Japanese company, Sakai Chemical Industries) in an amount of 7% by weight thereof on the basis of the resin solid content of the said polyamide-imide insulating varnish, and fully stirred and dispersed, whereby another type of insulating varnish was obtained.

REFERENTIAL EXAMPLE 15

To the polyamide-imide insulating varnish obtained in the Referential Example 1 was added $SiO_2$ (Aerosil 200 by Nippon Aerosil Co.) in an amount of 5% by weight thereof on the basis of the resin solid content of the said polyamide-imide insulating varnish, and 1% by weight, on the basis of the resin solid content of the said polyamide-imide insulating varnish, of KS701 (silicone solution by Shinetsu Co.) was further added thereto and fully stirred and dispersed, whereby another type of insulating varnish was obtained.

REFERENTIAL EXAMPLE 16

To the insulating varnish obtaind in the Referential Example 2 was added $SiO_2$ (Aerosil 200 by Nippon Aerosil Co.) in an amount of 7% by weight thereof on the basis of the resin solid content of the said insulating varnish and fully stirred and dispersed, whereby another type of insulating varnish was obtained.

REFERENTIAL EXAMPLE 17

To the insulating varnish obtained in the Referential Example 2 was added $SiO_2$ (Aerosil 200 by Nippon Aerosil Co.) in an amount of 7% by weight thereof on the basis of the resin solid content of the said insulating varnish, and 1% by weight, on the basis of the resin solid content of the said insulating varnish, of KS700 (silicone solution by Shinetsu Co.) was further added, and fully stirred and dispersed, whereby another type of insulating varnish was obtained.

REFERENTIAL EXAMPLE 18

To the polyamide-imide insulating varnish obtained in the Referential Example 1 was added KP321 (silicone solution by Shinetsu Co.) in an amount of 1.0% by weight thereof on the basis of the said polyamide-imide insulating varnish, and fully stirred and dispersed, whereby another type of insulating varnish was obtained.

REFERENTIAL EXAMPLE 19

50 parts by weight of dioxtyl phthalate and 5 parts by weight of tri-basic lead sulfate were incorporated in 100 parts by weight of polyvinyl chloride resin to form a polyvinyl chloride insulating composition.

REFERENTIAL EXAMPLE 20

3 parts by weight of dicumyl peroxide and 0.5 part by weight of anti-aging agent were incorporated in 100 parts by weight of polyethylene to form a polyethylene insulating composition.

REFERENTIAL EXAMPLE 21

6.0 parts by weight of dioctyl phthalate, 60 parts by weight of calcium carbonate and 5 parts by weight of tri-basic lead sulfate were incorporated in 100 parts by weight of vinyl chloride resin to form a vinyl chloride insulating composition.

REFERENTIAL EXAMPLE 22

100g of polyvinyl chloride mixture consisting of 50 parts by weight of dioxtyl phthalate, 5 parts by weight of tri-basic lead sulfate and 25 parts by weight of green pigment incorporated in 100 parts by weight of vinyl chloride resin were dissolved in 400g of cyclohexanone to obtain an insulating varnish.

REFERENTIAL EXAMPLE 23

To 100 parts by weight of the polyamide-imide insulating varnish obtained in the Referential Example 1 were added 10 parts by weight of green pigment, and admixed and stirred, whereby another type of colored insulating varnish was obtained.

COMPARATIVE EXAMPLE 1

On a silver plated copper alloy wire having a diameter of 0.26 mm, the polyamide-imide insulating varnish obtained in the Referential Example 1 was repeatedly coated and baked several times to obtain a polyamide-imide insulated wire. The thickness of the insulating layer of this insulated wire was 92 $\mu$. The characteristics of the insulated wire thus obtained are shown in the Table 4.

COMPARATIVE EXAMPLE 2

On a copper wire having a diameter of 1.0 mm, the insulating varnish obtained in the Referential Example 1 was repeatedly coated and baked several times to obtain a polyamide-imide insulated wire. The thickness of the insulating layer of this insulated wire was 43 μ. The characteristics of the insulated wire thus obtained are shown in the Table 4.

COMPARATIVE EXAMPLE 3

On a copper wire having a diameter of 0.26mm, the insulating varnish obtained in the Referential Example 1 was repeatedly coated and baked several times to obtain a polyamide-imide insulated wire. The thickness of the insulating layer of this insulated wire was 115 μ. The characteristics of the insulated wire thus obtained are shown in the Table 4.

COMPARATIVE EXAMPLE 4

On a silver plated copper alloy wire having a diameter of 0.26 mm, a polyvinyl chloride mixture consisting of 50 parts by weight of dioctyl phthalate and 5 parts by weight of tri-basic lead sulfate incorporated in 100 parts by weight of polyvinyl chloride resin was coated by extrusion to obtain a polyvinyl chloride coated wire. The thickness of the insulating layer of this insulated wire was 120 μ. The characteristics of the insulated wire thus obtained are shown in the Table 4.

COMPARATIVE EXAMPLE 5

On a Constantan wire having a diameter of 0.32 mm, the insulating varnish of the Referential Example 1 was coated and baked to obtain an insulated resistance wire. The thickness of the insulating layer of this insulated resistance wire was 89 μ. The characteristics of the insulated resistance wire thus obtained are shown in the Table 4.

COMPARATIVE EXAMPLE 6

On a nichrome wire having a diameter of 0.28 mm, a polyvinyl chloride mixture consisting of 50 parts by weight of dioctyl phthalate and 5 parts by weight of tri-basic lead sulfate incorporated in 100 parts by weight of polyvinyl chloride resin was coated by extrusion to obtain an insulated resistance wire. The thickness of the insulating layer of this insulated resistance wire was 120 μ. The characteristics of the insulated resistance wire thus obtained are shown in the Table 4.

COMPARATIVE EXAMPLE 7

On a copper wire having a diameter of 1.6 mm, the polyvinyl chloride insulating composition of the Referential Example 19 was coated by extrusion to obtain an insulated wire, the thickness of the insulating layer thereof being 0.8mm. The characteristics of the insulated wire thus obtained are shown in the Table 4.

COMPARATIVE EXAMPLE 8

On a copper wire having a diameter of 1.6 mm, the polyimide insulating varnish of the Referential Example 2 was coated and baked, the thickness of the formed insulating layer being 0.050mm. On the insulating layer, the polyvinyl chloride insulating composition of the Referential Example 19 was further coated by extrusion to obtain an insulated wire, the total thickness of the thus obtained insulating layer of the final insulated wire being 0.8 mm. The characteristics of the insulated wire thus obtained are shown in the Table 4.

EXAMPLE 1

On a silver plated copper alloy wire having a diameter of 0.26mm was provided a releasing layer of KS700 which was coated and baked on the wire. On this releasing layer thus provided, the polyamide-imide insulating varnish obtained in the Referential Example 1 was repeatedly coated and baked several times to obtain a polyamideimide insulated wire. The structure of the insulated wire thus obtained is shown in the Table 1, and the characteristics thereof in the Table 3.

EXAMPLES 2-24

According to the same procedure as in the Example 1, a releasing layer was provided on a metallic wire, and an insulating varnish was coated and baked on the said layer to form an electrical insulation coated metallic wire. In these Examples 2-24 various kinds of electrical insulation coated metallic wires were prepared by the said procedure. The structure of each of the obtained wires is shown in the Table 1 and the characteristics thereof in the Table 3.

EXAMPLE 25

On a copper wire having a diameter of 0.26 mm, KS700 was coated and baked to form a releasing layer thereon. On the releasing layer, the insulating varnish obtained in the Referential Example 2 was coated and baked to form an insulating layer as an under layer. Further, on the under layer of the insulating layer, the insulating varnish obtained in the Referential Example 1 was coated and baked to form another insulating layer as an upper layer, whereby an insulated wire having the releasing layer and the two insulating layers superposed thereon was obtained. The structure of the insulated wire thus obtained is shown in the Table 2 and the characteristics thereof in the Table 3.

EXAMPLES 26-48

According to the same procedure of the Example 25, various kinds of electrical insulation coated metallic wires were prepared each having two insulating layers, under insulating layer and upper insulating layer.

The structure of the electrical insulation coated metallic wire obtained in each of these Examples 26-48 is shown in the Table 2, and the characteristics thereof in the Table 3.

EXAMPLE 49

On the insulated wire obtained in the Example 26, the insulating varnish of the Referential Example 10 was again coated and baked to form another insulating layer having a thickness of 9 μ, the total thickness of the insulating layers of the final insulated wire being 99μ. The characteristics of the insulated wire thus obtained are shown in the Table 3.

EXAMPLE 50

On the insulated wire obtained in the Example 29, the insulating varnish of the Referential Example 1 was again coated and baked to form another insulating film having a thickness of 8 μ, the total thickness of the insulating layers of the final insulated wire being 50 μ. The characteristics of the insulated wire thus obtained are shown in the Table 3.

EXAMPLE 51

On the insulated wire obtained in the Example 32, the insulating varnish of the Referential Example 18 was again coated and baked to form another insulating film having a thickness of 10 μ, the total thickness of the insulating layers of the final insulated wire being 102 μ. The characteristics of the insulated wire thus obtained are shown in the Table 3.

EXAMPLE 52

On the insulated wire obtained in the Example 39, the insulating varnish of the Referential Example 1 was again coated and baked to form another insulating layer having a thickness of 10 μ, the total thickness of the insulating layers of the final insulated wire being 50 μ. The characteristics of the insulated wire thus obtained are shown in the Table 3.

EXAMPLE 53

On the insulated wire of the Example 41, the insulating varnish of the Referential Example 10 was again coated and baked to form another insulating layer having a thickness of 9 μ. The total thickness of the insulating layer of the final insulated wire being 99 μ. The characteristics of the insulated wire thus obtained are shown in the Table 3.

EXAMPLE 54

On the insulated wire of the Example 42, the insulating varnish of the Referential Example 1 was again coated and baked to form another insulating layer having a thickness of 9 μ, the total thickness of the insulating wire being 90 μ. The characteristics of the insulated wire thus obtained are shown in the Table 3.

EXAMPLE 55

On a copper wire having a diameter of 1.6 mm, a silicone consisting of KS709 and a slight amount of hardener added thereto was coated and baked to provide a releasing layer. On this releasing layer, the polyimide insulating varnish of the Referential Example 2 was coated and baked to form an insulating layer having a thickness of 0.050 mm. On this insulating layer, the polyvinyl chloride insulating composition of the Referential Example 19 was further coated by extrusion to form another upper insulating layer, whereby an insulated wire was obtained, the thickness of the last coated layer being 0.8 mm. The characteristics of the insulated wire thus obtained are shown in the Table 3.

EXAMPLE 56

On a copper wire having a diameter of 1.6 mm, a silicone consisting of KS705F and a slight amount of hardener added thereto was coated and baked to provide a releasing layer. On this releasing layer, the polyamide-imide insulating varnish of the Referential Example 1 was coated and baked to form an insulating film having a thickness of 0.050 mm. On this insulating layer, the vinyl chloride insulating composition of the Referential Example 19 was further coated by extrusion to form another upper insulating layer, whereby an insulated wire was obtained, the thickness of the last coated layer being 0.8 mm. The characteristics of the insulated wire thus obtained are shown in the Table 3.

EXAMPLE 57

On a copper wire having a diameter of 1.0mm, a silicone consisting of KS709 and a slight amount of hardener added thereto was coated and baked to provide a releasing layer. On this releasing layer, the polyimide insulating varnish of the Referential Example 2 was coated and baked to form an insulating layer having a thickness of 0.045 mm. On this insulating layer, the polyethylene insulating composition of the Referential Example 20 was further coated by extrusion to form another upper insulating layer having a thickness of 0.8 mm, and then the polyethylene was cross-linked at about 180° C, whereby an insulated wire was obtained. The characteristics of the insulated wire thus obtained are shown in the Table 3.

EXAMPLE 58

On a copper wire having a diameter of 1.6 mm, a silicone consisting of KS709 and a slight amount of hardener added thereto was coated and baked to provide a releasing layer. On this releasing layer, the polyimide insulating varnish of the Referential Example 2 was coated and baked to form an insulating layer having a thickness of 0.040 mm. On this insulating layer, the polyvinyl chloride insulating composition of the Referential Example 21 was further coated by extrusion to form another upper insulating layer, whereby an insulated wire was obtained, the thickness of the last coated layer being 0.8 mm. The characteristics of the insulated wire thus obtained are shown in the Table 3.

In the Tables 3 and 4, Stripper 1 is No-NIK Wire Stripper (U.S. Pat. No. 3,336,666) of Clauss Cutlery Company (U.S.A.), and Stripper 2 is a commercially cold nipper. The mark O in these Tables means that the stripping was possible and the mark X means that the stripping was impossible.

The pulling-out strength was determined by means of Instron (Model No. TM-M) of Instron Corporation (U.S.A.).

The abrasion resistance was determined by means of a repeated scrape method of Japanese Industrial Specification.

The cut-through resistance was determined as follows: To the electrical insulation coated metallic wire to be measured was applied 90°V edge, a load weighing 500g was charged thereto in an atmosphere of 180° C. The period to be taken from the initial charging of the load to the time when the insulating layer of the tested wire was completely cut through under the load was determined.

In the Table 3, the static friction coefficient is one measured by using a wire-to-wire friction coefficient, and the testing method therefor was as follows: Two sample wires were fixed on a metallic block in parallel, and these were placed on the other two sample wires which were put on a plane in parallel in such state that each of the said wires made a right angle with each other, and the top end of the former wires was loaded whereupon the static friction coefficient was determined.

EXAMPLE 59

On the insulated wire obtained in the Example 1, the insulating varnish of the Referential Example 14 was coated and baked, whereby another type of insulated wire was obtained having a colored layer the thickness of which was 20 μ.

EXAMPLE 60

On the insulated wire obtained in the Example 11, the insulating varnish of the Referential Example 22 was coated and baked, whereby another type of insulated wire was obtained having a colored layer the thickness of which was 10 μ.

EXAMPLE 61

On the insulated wire obtained in the Example 9, the insulating varnish of the Referential Example 23 was coated and baked, whereby another type of insulated wire was obtained having a colored layer the thickness of which was 15 μ.

EXAMPLE 62

On the insulated resistance wire obtained in the Example 48, the insulating varnish of the Referential Example 23 was coated and baked, whereby another type of insulated resistance wire was obtained having a colored layer the thickness of which was 12 μ.

EXAMPLE 63

On the insulated wire obtained in the Example 1, a copolymerized polyamide insulating varnish was coated and baked whereby another type of insulated wire was obtained having a self-bonding layer the thickness of which was 18 μ. Two of these insulated wires were twisted and the thus twisted wires were subjected to heat treatment at 200° C and bonded.

Table 1

| Example Nos. | Metallic Wire used | Diameter of Metallic Wire (mm) | Releasing Layer Silicone used | Insulating Layer used (Ref. Example Nos.) | Thickness of Insulating Layer (μ) |
|---|---|---|---|---|---|
| 1 | silver plated copper alloy wire | 0.26 | KS700 | 1 | 90 |
| 2 | silver plated copper wire | 0.26 | KS700 | 2 | 91 |
| 3 | silver plated copper alloy wire | 0.26 | KS700 | 4 | 45 |
| 4 | silver plated copper alloy wire | 0.26 | KS700 | 5 | 42 |
| 5 | silver plated copper alloy wire | 0.26 | KS700 | 6 | 40 |
| 6 | silver plated copper alloy wire | 0.26 | KS701 | 1 | 43 |
| 7 | silver plated copper alloy wire | 0.26 | KR282 | 1 | 38 |
| 8 | silver plated copper alloy wire | 0.26 | KP330 | 1 | 45 |
| 9 | silver plated oxygen free copper wire | 0.26 | KC88 | 1 | 85 |
| 10 | silver plated oxygen free copper wire | 0.26 | KS705F | 1 | 83 |
| 11 | silver plated copper alloy wire | 0.26 | KS709 | 1 | 89 |
| 12 | copper wire | 1.0 | KS705F | 1 | 45 |
| 13 | copper wire | 1.0 | KS709 | 1 | 43 |
| 14 | copper wire | 1.0 | KS705F | 7 | 41 |
| 15 | oxygen free copper wire | 0.26 | KS700 | 1 | 42 |
| 16 | copper wire | 0.26 | KS700 | 7 | 38 |
| 17 | copper wire | 0.30 | KS701 | 8 | 43 |
| 18 | silver plated copper alloy wire | 0.26 | KS701 | 14 | 90 |
| 19 | copper wire | 0.30 | KP330 | 12 | 43 |
| 20 | copper wire | 0.30 | KS701 | 3 | 41 |
| 21 | nichrome wire | 0.28 | KS700 | 1 | 90 |
| 22 | nichrome wire | 0.28 | KC88 | 2 | 41 |
| 23 | Constantan wire | 0.32 | KS700 | 10 | 42 |
| 24 | Constantan wire | 0.32 | KC88 | 1 | 35 |

Table 2

| Example Nos. | Metallic Wire used | Layer Metallic Wire Diameter of Metallic Wire (mm) | Releasing Layer Silicone used | Lower Insulating Layer Insulating Varnish used (Ref. Example Nos.) | Lower Insulating Layer Thickness of Insulating Layer (μ) | Upper Insulating Total Insulating Varnish used (Ref. Example Nos.) | Upper Insulating Total Thickness of Insulating Layer (μ) | Thickness of Insulating Layer (μ) |
|---|---|---|---|---|---|---|---|---|
| 25 | copper wire | 0.26 | KS700 | 2 | 32 | 1 | 8 | 40 |
| 26 | silver plated copper alloy wire | 0.26 | KS701 | 8 | 10 | 1 | 80 | 90 |
| 27 | silver plated copper alloy wire | 0.26 | KP330 | 9 | 5 | 2 | 35 | 40 |
| 28 | silver plated copper alloy wire | 0.26 | KP330 | 11 | 6 | 4 | 83 | 89 |
| 29 | copper wire | 0.30 | KP330 | 9 | 4 | 4 | 38 | 42 |
| 30 | silver plated copper wire | 0.26 | KS701 | 11 | 8 | 2 | 37 | 45 |
| 31 | silver plated copper wire | 0.26 | KS701 | 11 | 11 | 1 | 29 | 40 |
| 32 | silver plated copper wire | 0.26 | KS701 | 12 | 7 | 1 | 85 | 92 |
| 33 | silver plated oxygen free copper wire | 0.26 | KS701 | 13 | 5 | 4 | 40 | 45 |
| 34 | copper wire | 0.26 | KS701 | 15 | 6 | 2 | 37 | 43 |
| 35 | silver plated copper alloy wire | 0.26 | KS701 | 16 | 5 | 1 | 36 | 41 |
| 36 | silver plated copper alloy wire | 0.26 | KS701 | 17 | 9 | 1 | 80 | 89 |
| 37 | silver plated copper alloy wire | 0.26 | KP330 | 12 | 4 | 1 | 38 | 42 |
| 38 | copper wire | 0.30 | KS701 | 13 | 10 | 1 | 81 | 91 |
| 39 | copper wire | 0.30 | KP330 | 16 | 8 | 2 | 32 | 40 |
| 40 | copper wire | 0.30 | KP330 | 17 | 10 | 1 | 66 | 76 |
| 41 | silver plated copper alloy wire | 0.26 | KS701 | 2 | 15 | 1 | 69 | 84 |
| 42 | silver plated copper alloy wire | 0.26 | KS701 | 3 | 12 | 1 | 75 | 87 |
| 43 | silver plated copper alloy wire | 0.26 | KP330 | 2 | 8 | 4 | 82 | 90 |
| 44 | silver plated copper alloy wire | 0.26 | KP330 | 2 | 5 | 5 | 82 | 87 |
| 45 | copper wire | 0.30 | KP330 | 2 | 71 | 1 | 8 | 77 |
| 46 | nichrome wire | 0.28 | KC88 | 2 | 41 | 1 | 11 | 52 |
| 47 | Constantan wire | 0.32 | KC88 | 2 | 43 | 10 | 8 | 51 |
| 48 | Constantan wire | 0.32 | KS700 | 11 | 5 | 1 | 35 | 40 |

Table 3

| Example Nos. | Releasing Ability Stripper 1 | Releasing Ability Stripper 2 | Pulling Out Strength (g) | Abrasion Resistance (times) (Repeated Scrape Wt=700g) | Cutthrough Resistance | Static Friction Factor (μ) |
|---|---|---|---|---|---|---|
| 1 | o | o | 770 | | more than 15 min. | 0.11 |
| 2 | o | o | 790 | more than 200 | more than 15 min. | |
| 3 | o | o | | | | |
| 4 | o | o | | | | |
| 5 | o | o | | | | |
| 6 | o | o | | | | |
| 7 | o | o | | | | |
| 8 | o | o | | | | |
| 9 | o | o | 680 | more than 200 | more than 15 min. | |
| 10 | o | o | 480 | | | 0.10 |
| 11 | o | o | 420 | more than 200 | more than 15 min. | |
| 12 | | o | | | more than 15 min. | |
| 13 | | o | | | | |
| 14 | | o | | | | |
| 15 | o | o | | | | |
| 16 | o | o | | | | |

Table 3-continued

| Example Nos. | Releasing Ability Stripper 1 | Stripper 2 | Pulling Out Strength (g) | Abrasion Resistance (times) (Repeated Scrape Wt=700g) | Cutthrough Resistance | Static Friction Factor ($\mu$) |
|---|---|---|---|---|---|---|
| 17 | o | o | | | | |
| 18 | o | o | | | | |
| 19 | o | o | | | | |
| 20 | o | o | | | | |
| 21 | o | o | 730 | more than 200 | more than 15 min. | 0.13 |
| 22 | o | o | | | more than 15 min. | |
| 23 | o | o | | | more than 15 min. | |
| 24 | o | o | | | | |
| 25 | o | o | | | | |
| 26 | o | o | | more than 200 | more than 15 min. | 0.12 |
| 27 | o | o | | | | |
| 28 | o | o | | 42 | | |
| 29 | o | o | | | | |
| 30 | o | o | | | | |
| 31 | o | o | | | | |
| 32 | o | o | 430 | | more than 15 min. | |
| 33 | o | o | | | | |
| 34 | o | o | | | | |
| 35 | o | o | | | | |
| 36 | o | o | | | more than 15 min. | |
| 37 | o | o | | | | |
| 38 | o | o | | | | |
| 39 | o | o | | | | |
| 40 | o | o | | | | |
| 41 | o | o | 430 | more than 200 | more than 15 min. | 0.12 |
| 42 | o | o | 450 | more than 200 | more than 15 min. | 0.11 |
| 43 | o | o | | 52 | | |
| 44 | o | o | | 98 | | |
| 45 | o | o | | | | |
| 46 | o | o | | | | |
| 47 | o | o | | | | |
| 48 | o | o | | | | |
| 49 | o | o | | more than 200 | | 0.08 |
| 50 | o | o | | | | |
| 51 | o | o | | | | |
| 52 | o | o | | | | |
| 53 | o | o | 480 | more than 200 | more than 15 min. | 0.08 |
| 54 | o | o | | | more than 15 min. | |
| 55 | o | o | | | more than 15 min. | |
| 56 | o | o | | | more than 15 min. | |
| 57 | o | o | | | more than 15 min. | |
| 58 | o | o | | | more than 15 min. | |

Table 4

| Example Nos. | Releasing Layer Stripper 1 | Stripper 2 | Pulling-out Strength (g) | Abrasion Resistance (times) (load 700g) | Cutthrough Resistance (hours) |
|---|---|---|---|---|---|
| 1 | x | x | | more than 200 | more than 15 min. |
| 2 | x | | | | |
| 3 | x | x | | more than 200 | |
| 4 | o | o | 230 | 1 | less than 1 min. |
| 5 | x | x | | more than 200 | more than 15 min. |
| 6 | o | o | 280 | 1 | less than 1 min. |
| 7 | | o | | | less than 1 min. |
| 8 | | x | | | more than 15 min. |

What we claim is:

1. An electrical insulation-coated metallic wire characterized by the provision of a releasing layer on said metallic wire and of at least one insulating enamel layer superposed on the said releasing layer; said releasing layer being formed by coating and baking a layer consisting essentially of a silicone having a releasing ability onto said metallic wire, and said insulating enamel layer being formed by coating and baking an insulating varnish on said releasing layer.

2. A metallic wire as claimed in claim 1, said insulating layer containing a silicone.

3. A metallic wire as claimed in claim 1, said insulating layer containing a filler.

4. A metallic wire as claimed in claim 1, said insulating layer containing a polyimide-series polymer.

5. A metallic wire as claimed in claim 1, wherein a conductor is used as the metallic wire.

6. A metallic wire as claimed in claim 1, wherein a resistance wire is used as the metallic wire.

7. A metallic wire as claimed in claim 1, wherein said insulating layer has a thickness of less than 100 $\mu$.

8. A metallic wire as claimed in claim 1, for use in the internal wiring of electronic equipment.

* * * * *